United States Patent [19]

Bongers et al.

[11] Patent Number: 4,614,792

[45] Date of Patent: Sep. 30, 1986

[54] ANIONIC POLYMERIZATION OF LACTAM WITH ALKALINE EARTH METAL COMPOUND CATALYST, LACTAM COMPOUND ACTIVATOR AND ESTER COMPOUND

[75] Inventors: Jozef J. M. Bongers, Elsloo; Albert A. van Geenen, Brunssum, both of Netherlands

[73] Assignee: Stamicarbon B.V., Geleen, Netherlands

[21] Appl. No.: 742,412

[22] Filed: Jun. 7, 1985

[30] Foreign Application Priority Data

Jun. 9, 1984 [NL] Netherlands .................... 8401843

[51] Int. Cl.$^4$ .............................................. C08G 69/20
[52] U.S. Cl. .................................. 528/318; 528/312; 528/315; 528/323; 528/326
[58] Field of Search ............... 528/318, 315, 323, 312, 528/326

[56] References Cited

U.S. PATENT DOCUMENTS

| | | | |
|---|---|---|---|
| 2,809,958 | 10/1957 | Barnes et al. | 528/318 |
| 3,042,659 | 7/1962 | Follett | 528/318 |
| 3,214,415 | 10/1965 | Giberson | 528/318 |
| 3,316,221 | 4/1967 | Hyde | 528/318 |
| 3,397,185 | 8/1968 | Tetenbaum | 528/318 |
| 3,898,198 | 8/1975 | McGrath | 528/318 |

FOREIGN PATENT DOCUMENTS

| | | |
|---|---|---|
| 47-4759 | 10/1972 | Japan . |
| 945218 | 12/1963 | United Kingdom . |
| 1045884 | 10/1966 | United Kingdom . |
| 1045628 | 10/1966 | United Kingdom . |
| 775106 | 10/1980 | U.S.S.R. . |

OTHER PUBLICATIONS

Mattiussi et al., Anionic Polymerication of Caprolactam Organic Esters as Initiators, European Polymer Journal 1968, vol. 4, pp. 695–707.

*Primary Examiner*—Harold D. Anderson
*Attorney, Agent, or Firm*—Cushman, Darby & Cushman

[57] ABSTRACT

Process for preparing polyamide by anionically polymerizing lactam in the presence of an alkaline metal catalyst, an activator and at least one low molecular weight ester compound. The polymerization process is rapid and yields polyamides having good impact strengths. The process significantly reduces moulding time in reaction injection moulding.

14 Claims, 1 Drawing Figure

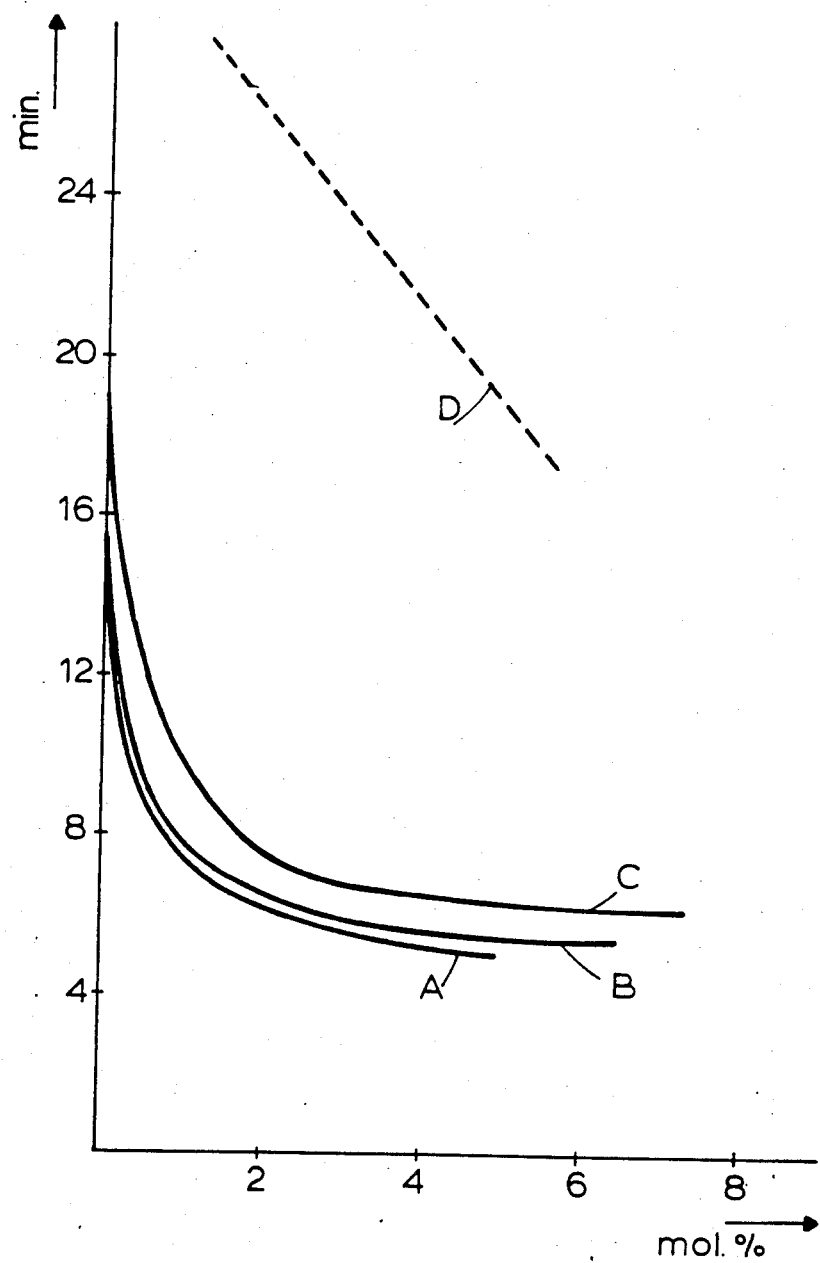

ANIONIC POLYMERIZATION OF LACTAM WITH ALKALINE EARTH METAL COMPOUND CATALYST, LACTAM COMPOUND ACTIVATOR AND ESTER COMPOUND

FIELD OF THE INVENTION

The present invention broadly relates to a process for manufacturing a polyamide by the anionically catalyzed polymerization of a lactam in the presence of an alkaline metal catalyst, an activator and an a low molecular weight ester compound.

BACKGROUND OF THE INVENTION

In the polyamide preparation field there are numerous reported attempts to device rapid polymerization processes permitting rapid moulding of nylon products. Various such attempts are now disclosed.

According to the process disclosed in U.S. Pat. No. 3,304,291, lactams may be polymerized by means of an alkali or alkaline earth metal catalyst and another compound which activates the alkaline-catalyzed polymerication of lactam. According to that U.S. patent, the derivatives of urea, thiourea and guanidine are particularly suitable as activators. An example of such a compound is lactam-blocked 1,6-hexamethylene diisocyanate.

The European patent application No. 134616 described a process for polymerizing lactams in the presence of an alkaline metal catalyst and a polymer activator. The polymer activator may be obtained by reacting a highmolecular polyol with a lactam-blocked diisocyanate. According to that application, products are obtained that possess high impact strength.

U.S. Pat. No. 3,862,262 describes the preparation of nylon block copolymers in the presence of a metal compound and a condensation product of an acyl-bis-lactam, and a polyol.

British Patent No. 1,067,153 describes the application of the reaction product of polypropylene glycol, and 2,4toluene diisocyanate as accelerator for the anionically catalyzed polymerization of lactam.

SUMMARY AND OBJECTS OF THE INVENTION

The present invention provides an advantageous process for manufacturing polyamides by conducting the anionically catalyzed polymerization of at least one lactam in the presence of an alkaline metal catalyst, an activator, and a low molecular weight ester compound.

The present invention provides a process for rapidly polymerizing lactams into nylon products having excellent impact strength.

The present invention provides a process for significantly reducing the moulding time in a reaction injection moulding process for producing nylon products.

DETAILED DESCRIPTION OF FIG. 1

FIG. 1 shows a graphic representation of the polymerization time as a function of the amount of ester for the process as described in Example II. The vertical axis shows the time from the point at which the several components are mixed until the polyamide releases from the wall of the mould, whilst the horizontal axis shows the amount of dimethyl terephthalate (mol % relative to caprolactam). Graphs A, B and C relate to different amounts of catalyst, viz. 3, 2 and 1 mol % of lactam magnesium bromide. Graph D is comparable with Graph C except that no activator is used.

DETAILED DESCRIPTION OF THE INVENTION

According to the present invention, a process for manufacturing a polyamide is provided and comprises conducting the anionically catalyzed polymerization of a lactam or lactams in the presence of an alkaline metal catalyst, an activator and a low molecular weight ester compound.

The low molecular weight ester compounds useful in the present process include the various mono- or diesters or organic carboxylic acids with organic alcohols. A precondition is selecting the ester is that it must dissolve in the lactam to be polymerized. Suitable esters include the several aliphatic, aromatic and mixed esters whose boiling point exceeds the polymerization temperature at the pressure applied during polymerization reaction.

It is important that the ester should not have a too acidic character, like beta-keto acids; otherwise, it may interfere with the polymerization mechanism. In this regard, mildly acidic esters with pKa>13 are acceptable.

Examples of suitable exemplary esters are, for instance, dimethyl terephthalate, methyl acetate, amyl acetate, ethyl propionate, ethyl butyrate and mixtures thereof.

Advantageously, the ester is used in amounts ranging from 0.5 to 8 mol % with respect to the lactam used, more specifically from 1 to 4 mol % with respect to lactam.

Surprisingly, the use of an ester compound as a coactivator or co-catalyst in lactam polymerication reactions has proved to accelerate the polymerication significantly, without adversely affecting the mechanical properties of the end product. This is very important with RIM nylon products prepared by polymerizing a lactam or lactams. More particularly, it is exceedingly advantageous to provide a process for rapidly preparing polyamides because preferred molding times in RIM nylon production range from about 30 seconds to only a few minutes. Even more advantageously, providing means for reducing the RIM moulding time has considerable economic impact and hence is advantageous in, for example, producing automobile body parts.

In this context, the polymerization of lactam in the presence of an estered polyol compound but in the absence of another activator is known from U.S. Pat. No. 3,944,629. In that process, the estered polyol serves as activator whilst in the process according to the present invention an activator must be present in addition to the ester compound. It will be understood from a number of comparative examples that the effect according to the present invention does not arise if an ester compound is employed without a separate activator. This was quite surprising and unexpected; this is particularly true since activator and catalyst systems are not predictable.

The present conditions such as temperature and pressure may be varied. The process according to the present invention is practiced at the usual temperatures for anionic lactam polymerication. Typically the present process is conducted between about 90° C. and about 300° C., and more advantageously between about 120° C. and about 180° C. The pressure at which the polymerization takes place is not critically important;

the polymerication must in any case be carried out at pressure range between about 1 bar and about 50 bar. Often, the pressure will not be higher than about 10 bar to about 15 bar because one of the advantages of RIM nylon over RIM polyurethanes is the comparatively low pressure that may be applied.

In principle, the present process is suitable for polymerizing all lactams. Exemplary suitable lactams have 4 to 15 carbon atoms in the lactam ring. Advantageously, exemplary lactams include, for instance, 2-pyrrolidone, 2-piperidone, caprolactam or lauryllactam, or a mixture of two or more lactams. Preferably and thus advantageously, caprolactam is applied since this yields a polyamide having superior physical properties. Moreover, the reaction velocity of caprolactam is high. Preferably and most advantageously, a reaction system is employed which leads to the formation of nylon 6 homopolymers, nylon 6 random copolymers or nylon 6 block polymers.

The lactam polymerization occurs in the presence of an anionic polymerication catalyst, an activator and the disclosed low molecular weight ester compound(s). The anionic polymerization catalyst may be any of the known catalysts, such as Grignard catalysts. Exemplary catalysts include sodium lactamate, potassium lactamate or a compound such as bromomagnesium lactamate. Mixtures of catalysts may advantageously be used. Advantageously, the amount of catalyst used ranges from about 0.1 to about 10 mol % with respect to the lactam(s) used, more advantageously from about 0.3 to about 3 mol %. Similarly, the amount of activator advantageously ranges from about 0.1 to about 10 equivalent% with respect to the lactam, more advantageously from about 0.5 to about 4 eq. %.

Numerous activators are suitable for the polymerization of lactam according to the present invention. Advantageously, the activator, also referred to as a promotor, is selected from the group of lactam-ended isocyanates (which encompasses also the group of lactamended polyurethanes) and acyl lactam compounds. A number of these compounds are known in themselves and are described in, for example, U.S. Pat. No. 3,304,291, EPO No. 67,693, EPO No. 67,694 or EPO 67,695. The EPO patents were laid open for public inspection on or about Dec. 22, 1982. A process for the manufacture of a lactam-ended polymer isocyanate activator is described in U.S. Application Ser. No. 641,772 filed Aug. 17, 1984, now U.S. Pat. No. 4 540 516, which discloses a process for preparing an N-substituted carbamoyl-lactam activator by reacting a polyol having an equivalent weight of at least 300 and ranging up to about 2500 with a lactam-blocked polyisocyanate in the liquid state in the presence of a metal compound catalyst. The lactam-blocked polyisocyanate denotes the reaction product of a polyisocyanate or a diisocyanate with a lactam.

A high molecular weight activator is preferred for application in RIM nylon technology. In general, the activator is a reaction product of an organic hydroxy compound such as polyfunctional hydroxy compound (polyol) with at least 2 hydroxyl groups per molecule and a compound which yields activator groups. In principle, the known polyols may be used. Advantageously, the polyol may be a polyether polyol, polyester polyol, polybutadiene polyol, a siloxane-containing polyol and/or a so-called "polymer" polyol. The "polymer polyol" as herein defined comprises grafted polymers obtained by grafting one or more ethylenic unsaturated polymers onto a polyether polyol as well as polyurea dispersions in polyols. These polyurea dispersions may be obtained by dissolving a diamine or hydrazine together with a stoichiometric amount of diisocyanate in a polyol and allowing the dissolved components to react so as to obtain a polyurea compound dispersed in the polyol.

The above-described polyols possess a high molecular weight. Advantageously, the equivalent weight of the polyols should preferably be at least 300 up to about 3000 and more advantageously between about 1000 and about 2500. Optimal properties of the end product are achieved within these limits, viz. a high impact strength in combination with a high flexural modulus.

The molecular weight, or equivalent weight, as used in this context, relates to the number average weight. The term equivalent weight of a polyol relates to the number average weight of a polyol per hydroxyl group, that is, the molecular weight divided by the functionality.

As indicated above, the polyol is reacted with a compound which yields activator groups, preferably with a lactam-ended diisocyanate, which comprises also the lactam-blocked polyurethane. The lactam-blocked diisocyanate may be obtained by reacting lactam with a diisocyanate, for instance hexamethylene diisocyanate, isophorone diisocyanate, toluene diisocyanate, methylene-bis(phenyl isocyanate), MDI and hydrogenated MDI or modified MDI such as the carbodiimide-modified MDI (Isonate-143 L, Upjohn Company, or Mondur PF, Mobay Chemical Company), and diol-extended prepolymers of MDI. Other suitable diisocyanates are XDI, H6XDI and hydrogenated TDI. It is also possible to react the polyol with a diisocyanate in such amounts as to cause the polyol on each hydroxyl group to be linked with a diisocyanate and to react the polyurethane so produced, with a lactam.

Various aspects of reaction injection moulding are described in Kresta (editor) *Reaction Injection Molding*, ACS Symposium Series No. 270 (1985), the disclosure of which is incorporated herein by reference.

Experiments conducted by the Applicants herein have established that the anionically catalyzed polymerization of a lactam using the reaction injection moulding technique, particularly if an alkaline earth metal initiator is applied in combination with an isocyanate-based activator, yields products with good impact strength but that the reaction rate is unsatisfactory.

EXAMPLES

The present invention is illustrated with the following non-limiting examples.

The Examples I–III relate to the instant process whereas Examples IV and V relate to a prior art process. The Examples establish that the combination of the ester and activator in the instant process results in the rapid polymerization of lactams into nylon products having excellent physical properties.

EXAMPLE I 1.77 grams of caprolactam-blocked 1,6 hexamethylene diisocyanate (79% by weight in caprolactam), 1.38 grams of amyl acetate and 16.8 grams of coprolactam were weighed out and mixed in a test tube. 7.45 grams of lactam magnesium bromide (1 molar in caprolactam) and 14 grams of caprolactam were also weighed out and mixed in another test tube. The contents of both tubes were heated to 105° C. while being stirred. Subsequently the contents of each test tube were poured together and mixed. The overall composition of the mixture was 3.54 mmols of caprolactam-blocked 1,6 hexamethylene diisocyanate, 10.6 mmols of amyl acetate, 7.42 mmols of lactam magnesium bromide and 327 mmols of caprolactam. A solid polyamide releasing from the wall had formed about 5 minutes and 50 seconds at 130° C.

EXAMPLE II

In accordance with the procedure of Example I, a polyamide was prepared using a composition of 3.54 mmols of caprolactam-blocked 1,6 hexamethylene diisocyanate, 10.5 mmols of dimethyl terephthalate, 3.60 mmols of lactam magnesium bromide and 327 mmols of caprolactam at 130° C. The polyamide releasing from the wall of the test tube was obtained in 6 minutes and 45 seconds.

EXAMPLE III

In accordance with the procedure of Example I, a polyamide was prepared using a composition of 3.54 mmols of caprolactam-blocked 1,6 hexamethylene diisocyanate, 10.5 mmols of dimethyl adipate, 7.42 mmols of lactam magnesium bromide and 327 mmols of caprolactam at 130° C. The polyamide formed and released from the test tube wall in 6 minutes and 25 seconds.

EXAMPLE IV (Comparative Example Without Ester)

In accordance with the procedure of Example I, a polymer releasing from the wall was obtained after 20 minutes using 3.54 mmols of caprolactam-blocked 1,6 hexamethylene diisocyanate, 3.60 mmols of lactam magnesium bromide and 327 mmols of caprolactam at 130° C.

EXAMPLE V (Comparative Example Without Accelerator)

In accordance with the procedure of Example I, a release time of 27 minutes was measured using 10.6 mmols of amyl acetate, 7.42 mmols of lactam magnesium bromide and 3.27 mmols of caprolactam at 130° C.

As evident from Examples I–III and Comparative Examples IV–V, particularly Example V, the presence of both an ester compound and an activator, such as caprolactam-blocked 1,6 hexamethylene hexane diisocyanate, does indeed dramatically reduce the moulding time by a factor of several hundred percent.

Results comparable to those reported in Examples I–V are obtained using RIM apparatus.

Similarly, advantageous results are also obtained in accord with lactam-blocked diisocyanates based on lactams other than caprolactam and diisocyanates other than 1,6 hexamethylene diisocyanate. Additionally, advantageous results are obtained using other suitable lower molecular weight esters such as ethyl propionate, and ethyl butyrate.

We claim:

1. An anionically catalyzed polymerication process for manufacturing polyamides comprising:
   conducting the anionically catalyzed polymerication of at least one lactam in the presence of:
   an alkaline earth metal catalyst compound,
   an activator selected from the group consisting of lactam-ended isocyanates, lactam-ended polyurethanes, acyllactam compounds and mixtures thereof, and
   a low molecular weight ester compound having a pKa greater than 13.

2. Process according to claim 1 wherein said alkaline earth metal compound is a magnesium compound.

3. Process according to claim 1 wherein the reaction product of a polyol and a lactam-blocked diisocyanate is the lactam-ended isocyanate.

4. Process according to claim 1 wherein dimethyl terephthalate is the ester.

5. Process according to claim 1 wherein caprolactam is the lactam.

6. Process according to claim 1 wherein said ester is dimethyl terephthalate, said lactam is caprolactam and said activator is a reaction product of a polyol and a lactam-blocked diisocyanate.

7. Process according to claim 6 wherein said process is conducted at a temperature of about 90° C. to about 300° C.

8. Process according to claim 7 wherein said temperature is about 120° C. to about 180° C.

9. Process according to claim 1 wherein said ester is selected from the group consisting of methyl acetate, amyl acetate, ethyl propionate, ethyl butyrate, dimethyl terephthalate and mixtures thereof.

10. Process according to claim 9 wherein said lactam is selected from the group consisting of 2-pyrrolidone, 2-piperidone, caprolactam, lauryllactam and mixtures thereof.

11. Process according to claim 9, wherein said alkaline earth metal catalyst compound is a magnesium compound.

12. Process according to claim 9, wherein the reaction product of a polyol and a lactam-blocked diisocyanate is the lactam-ended isocyanate.

13. Process according to claim 9, wherein said ester is dimethyl terephthalate, said lactam is caprolactam and said activator is a reaction product of a polyol and a lactam-blocked diisocyanate.

14. Process according to claim 9, where in said process is conducted at a temperature of about 120° C. to about 180° C.

* * * * *